United States Patent [19]
Otter

[11] 3,906,551
[45] Sept. 23, 1975

[54] ARTIFICIAL INTRA-OCULAR LENS SYSTEM

[76] Inventor: Klaas Otter, Heresingel 28, Groningen, Netherlands

[22] Filed: Nov. 14, 1974

[21] Appl. No.: 523,897

Related U.S. Application Data

[63] Continuation-in-part of Ser. No. 440,728, Feb. 8, 1974, abandoned.

[52] U.S. Cl. .................................................... 3/13
[51] Int. Cl.² ........................ A61F 1/16; A61F 1/24
[58] Field of Search ....................... 3/13, 1; 351/160

[56] References Cited
UNITED STATES PATENTS

| | | | |
|---|---|---|---|
| 2,754,520 | 7/1956 | Crawford, Jr. | 3/13 |
| 3,074,407 | 1/1963 | Moon et al. | 3/13 UX |
| 3,673,616 | 7/1972 | Fedorov et al. | 3/13 |
| 3,711,870 | 1/1973 | Deitrick | 3/13 |

*Primary Examiner*—Ronald L. Frinks
*Attorney, Agent, or Firm*—Morgan, Finnegan, Pine, Foley & Lee

[57] ABSTRACT

An artificial intra-ocular lens system is provided with a haptic rim and with means for transiridially fixing the system in the eye.

14 Claims, 11 Drawing Figures

ARTIFICIAL INTRA-OCULAR LENS SYSTEM

This application is a continuation-in-part of copending application Ser. No. 440,728, filed Feb. 8, 1974, now abandoned. This invention relates to an artificial intra-ocular lens system.

The natural crystalline lens, for example, in man, is an optically clear organ situated behind the pupillary aperture of the eye. The function of this lens is to help form a sharp image on the retina to provide for acuity of vision. In certain circumstances opacity may develop in the lens, necessitating its surgical removal. After the extraction of the lens the eye is defective from an optical point of view due to the loss of diffraction of the lens, which should be corrected with optical aids. The condition of lens opacity is called cataract. The absence of the crystalline lens from the eye is known by the term aphakia. The optical correction of this condition is called aphakic correction.

There are three kinds of devices for aphakic correction: so-called cataractous spectacles worn in front of the eye, a contact lens worn on the eye, and an artificial intra-ocular lens implanted in the eye.

It will be understood that in implanting an artificial intra-ocular lens to replace the crystalline lens of the eye severe demands are made on the fastening of the lens in the eye.

A prior kind of artificial intra-ocular lens system is described by C. D. Binkhorst, for example, in Brit. J. Ophtal. 51 (1967) 767–77. The prior system has an optical part and two pairs of wire loops. After the implantation of the system in the eye two of these loops are located anterior to the iris and the other two posterior to the iris, and the lens is thus fixed more or less in the way of a collar-stud. The posterior loops restrain the system from moving forwardly through the pupillary aperture, and the anterior loops prevent backward movement of the lens. Actual fixation, however, is obtained by maintaining the pupillary rim in a state of tension through pupillary contraction induced medicamentously by means of eye-drops taken, for example, twice daily.

It is an object of the present invention to provide an artificial intraocular lens system whose fixation in the eye does not require medication and which accordingly needs no further attention after being implanted.

According to the present invention there is provided an artificial intraocular lens system, comprising an optical portion and a lens fixation or support portion including first lens fixation or support means to be positioned posterior to the iris and second lens fixation or support means to be positioned anterior to the iris, said first and second lens fixation or support means cooperating to prevent displacement of the lens system through the pupillary aperture, characterized in that said second lens fixation or support means comprises a haptic rim connected to and contiguous with at least part of the circumference of the optical portion of the lens system, and in that the lens system comprises transiridial lens-fixation means for transiridially fixing the lens system in the eye.

A "haptic part" is a well-known ophthalmological term denoting a part for fitting an artificial lens system on or within the eye.

According to the invention the transiridial lens-fixation means can take the form of at least two apertures formed in the lens system, said apertures allowing the passage of a suture inserted by means of a needle. Preferably the apertures are formed in the haptic rim.

In another embodiment of the invention, the transiridial lens-fixation means comprises a transiridially flexible lens-fixation member permanently connected to the lens system, which member can take the form of a flexible metal wire. The transiridially flexible lens-fixation member is preferably connected to the haptic rim.

Further features of the invention will become apparent from the following description read with reference to the accompanying diagrammatic drawings. In said drawings, FIG. 1 is a perspective view of a prior lens system as described by C. D. Binkhorst, loc. cit.;

Figure 1:
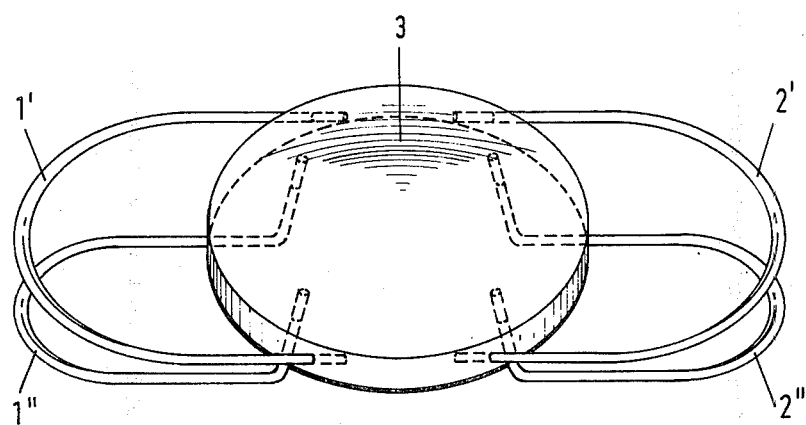
Figure 2:
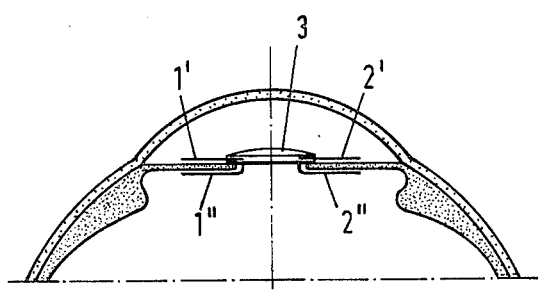
FIG. 2 shows, in section, the lens of FIG. 1 implanted in an eye.

Referring to the drawings, FIGS. 1 and 2 show, diagrammatically, a prior lens system developed by C. D. Binkhorst, loc. cit. The lens consists of an optical portion 3 and two pairs of loops 1', 1" and 2', 2". As shown in FIG. 2, after implantation two loops (1', 2') are located anterior to the iris and two loops (1", 2") are located posterior to the iris.

Figure 3:
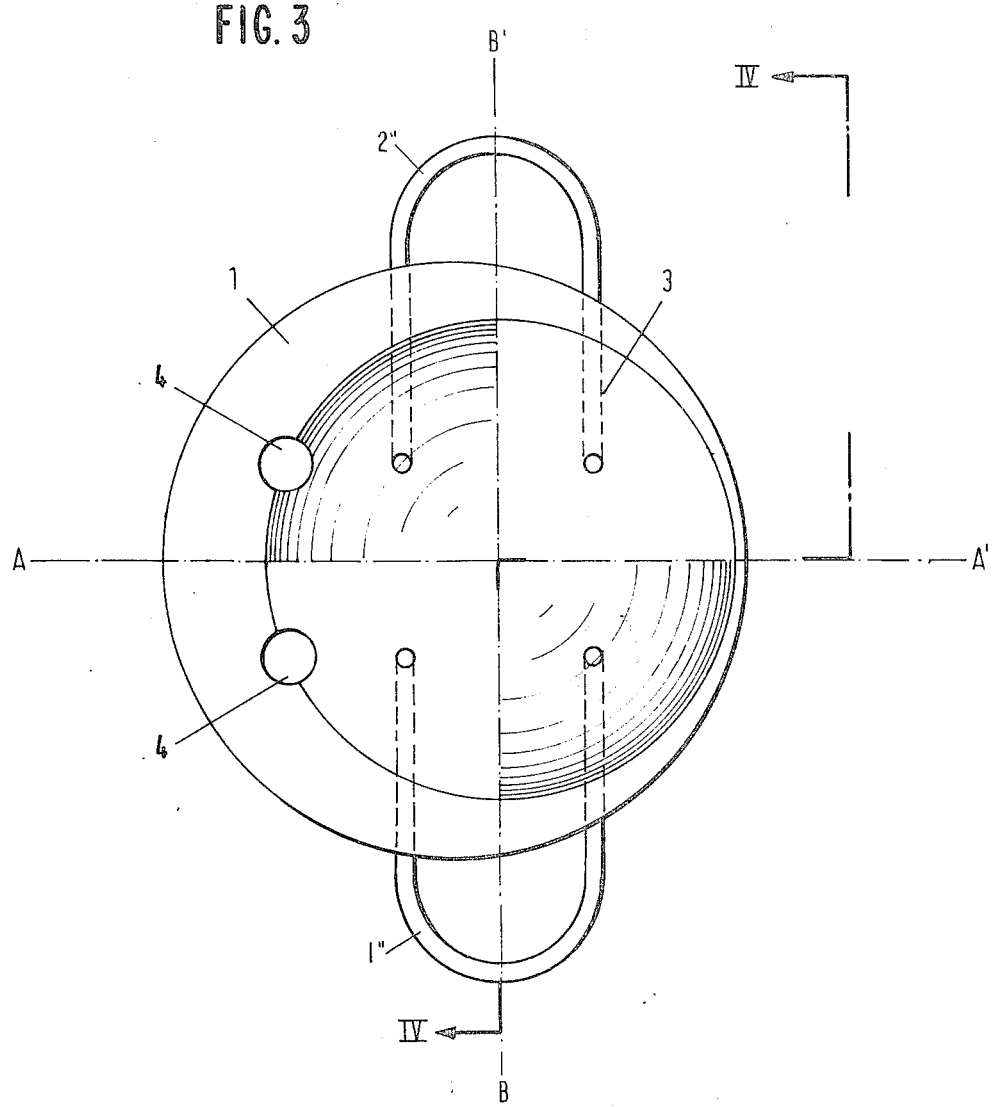
FIG. 3 is a plan view of a lens system according to the present invention.
Figure 4:
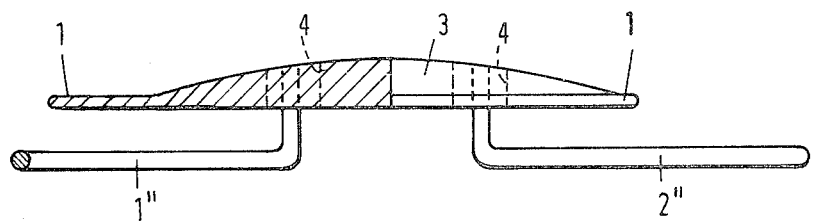
FIG. 4 is a part-sectional side elevation taken along line IV—IV of FIG. 3.

One embodiment of an intra-ocular lens system according to the present invention is shown in FIGS. 3 and 4. As shown, the system comprises an optical portion 3, which includes the lens body proper, and a lens fixation or support portion which in this embodiment comprises first lens fixation or support means in the form of loops 1", 2" and a second lens fixation or support means 1 in the form of an eccentric rim contiguous with optical portion 3 throughout the circumference of the latter. The rim if referred to herein and in the appendant claims as a haptic rim.

A pair of apertures 4 are formed in the haptic rim and preferably, as shown, in the region where the latter merges with the lens body. By these means the lens system can be transiridially fixed by being sutured to the iris.

The lens system is placed in position through the pupillary aperture so that support members 1" and 2" are located posterior to the iris and the lens fixation or support member 1 anterior to the iris, and so that means 4 are in a superior position. Subsequently a suture is passed through apertures 4 and through the iris by means of a needle, whose ends are finally knotted together. In this way the lens system is fixed in the eye independently of pupillary contraction or dilation.

Figure 5:
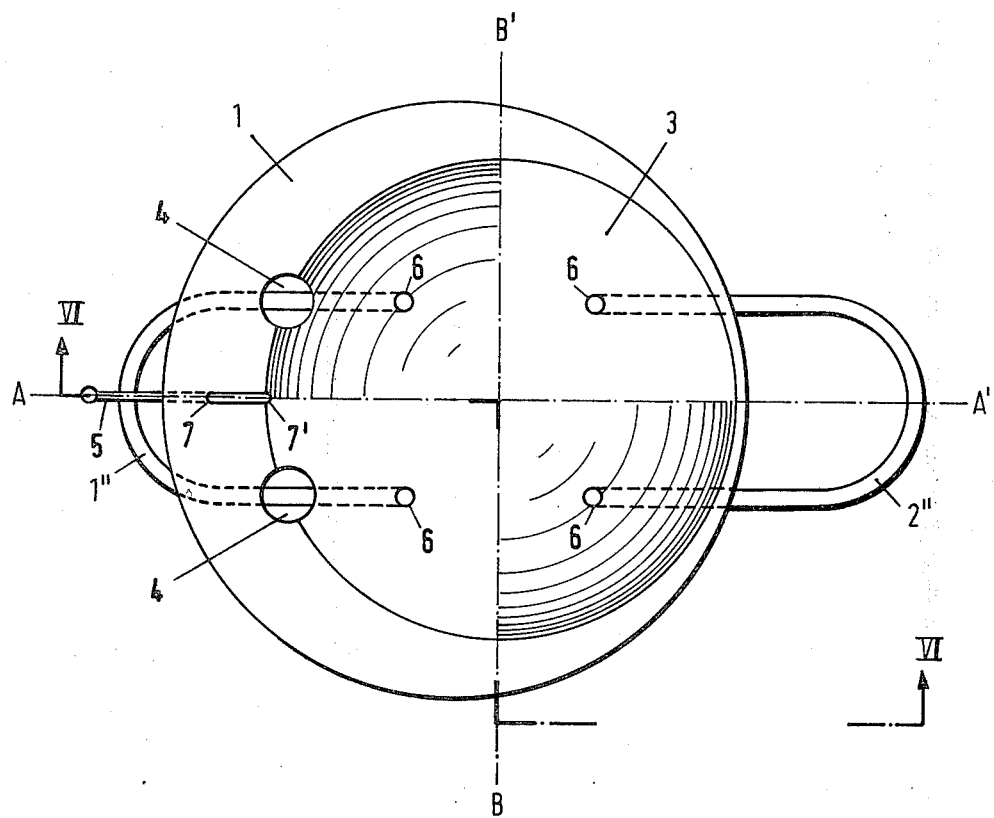
FIG. 5 is a plan view of another embodiment of a lens system according to the invention.
Figure 6:
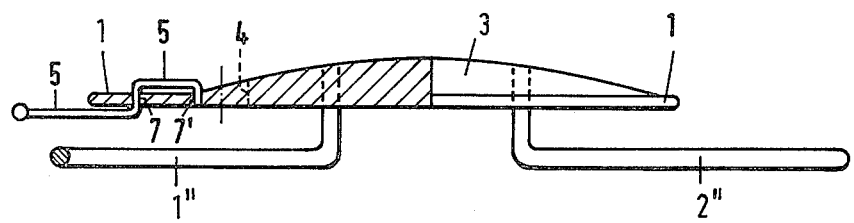
FIG. 6 is a part-sectional elevation taken along line VI—VI of FIG. 5.

The embodiment shown in FIGS. 5 and 6 is similar to that of FIGS. 3 and 4, except that the lens fixation or support means comprises a transiridially flexible lens fixation or support member in the form of a flexible wire 5, which is permanently connected to the lens system.

The lens system of FIGS. 5 and 6 is placed in position in the pupillary aperture so that support members 1″ and 2″ are located posterior to the iris and the lens fixation or support member 1 as well as the transiridially flexible lens fixation member 5 are located anterior to the iris with members 1″ and 5 in a superior position. Subsequently a small aperture is cut in the iris (iridectomy) and the flexible member is flexed rearwards through the iridectomy and can be contacted with loop 1″, located posterior to the iris, to form a socalled transiridial clip.

In addition, as in the embodiment of FIGS. 3 and 4, an extra fixation of the lens system can be accomplished by means of a suture through apertures 4. However, this is an optional measure, which the surgeon may wish to take, for example, when the insertion of the lens system has caused damage, e.g., torn the pupillary periphery.

The fixation of an intra-ocular lens by means of a suture passed through the iris requires great surgical skill. Therefore, the advantage of a transiridially flexible lens fixation member, such as that shown at 5 in FIG. 5, is that it greatly simplifies such transiridial fixation.

The embodiments of FIGS. 3–6 allow of various modifications.

Thus, the haptic rim can be centric, i.e., concentric with the optical portion of the lens system. Furthermore it can be provided with a plurality of transiridially flexible lens-fixation members, for example, two, each capable of being flexed into contact with a support member on the opposite side of the iris, to form a transiridial clip.

The transiridially flexible lens fixation member 5 can be pre-shaped in the form of a hook for engagement with the edge of the iridectomy. Furthermore the loop-shaped members 1″ and 2″ can have a different configuration.

In the embodiments shown in FIGS. 3 and 5, the four points of attachment 6 of support members 1″ and 2″ are arranged symmetrically relative to lines AA′ and BB′. Although this arrangement has practical advantages, such a construction is not necessary. The points of attachment can, basically, have random positions, provided that after implantation in the eye, the whole assembly of fixation or support members 1′–1″ and 2′–2″ and the means by which the lens system can be transiridially fixed in the eye, in combination, prevent luxation of the lens system.

The transiridial sutures to be passed through apertures 4 (FIGS. 3 and 5) can be made of any biologically inert, thin material that is not absorbed by the body. Common materials for the purpose are Nylon and Perlon (registered trademarks). Stainless steel and platinum are also suitable materials for making the wires.

The lens is made from polymethyl methacrylate. The fixation or support members are made of Supramid (registered trademark), which is an inert polymercaptan. They can instead be made of platinum, titanium or stainless steel wire.

The thickness of the wires is of importance to the extent that the overall weight of the system should preferably not exceed about 10–12 mg. A practical thickness is about 0.10 to 0.20 mm.

In making an intra-ocular lens, the anatomical dimensions of the eye should be taken into account. Consequently, the overall diameter of the lens system cannot be of any size. Normally this diameter is not larger than 7.0 mm.

The intra-ocular lenses of the present invention can be made by the molding process known for making contact lenses. In it, powdered or granular pure methyl methacrylate resin (Perspex CQ, Imperial Chemical Industries, Ltd., Great-Britain) is introduced into a mold of the desired shape and dimensions together with a suitable for its polymerization, and subsequently polymerized, possibly with ultraviolet irradiation. Subsequently holes are drilled in the lens thus formed, for example in the pattern of FIG. 5. Threads of, for example, Supramid of the desired length and thickness are then inserted through the holes 6 from the planar bottom of the lens body, and their ends are fused at the top so that the U-shaped threads can no longer be moved out of said holes.

After being heated at the appropiate places loops 1″ and 2″ can be bent into their definitive shape (cf. FIG. 6).

Subsequently the transiridial lens fixations member, e.g., a Pt wire, is passed through apertures 7-7′, while being bent into the desired shape. The end of the wire in aperture 7′ is upset and thus fixed therein, and a bead is fused on to the other end to round off the latter.

Figure 7:
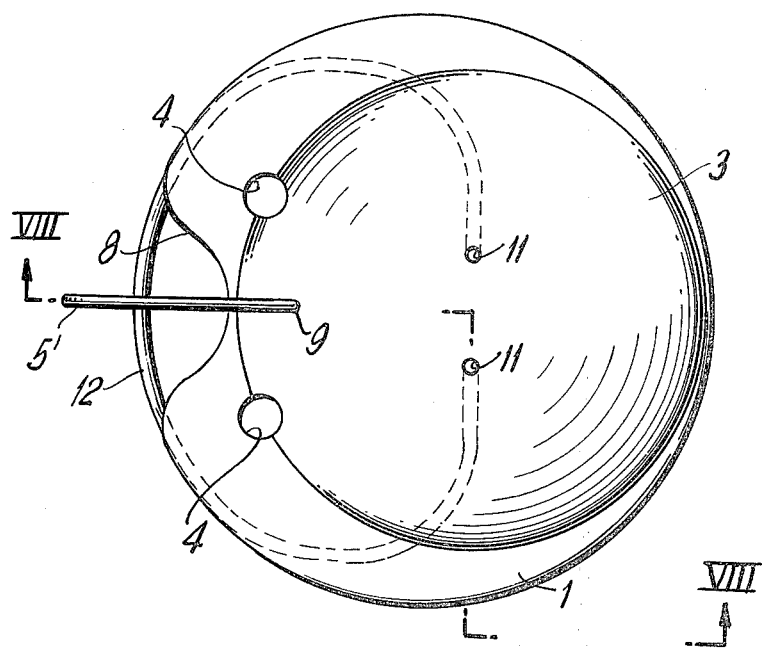
FIG. 7 is a plan view of another embodiment of a lens system according to the present invention.
Figure 8:
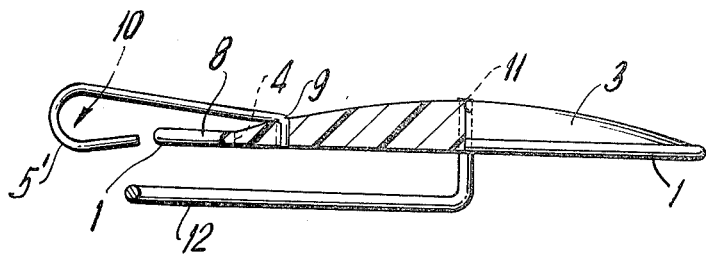
FIG. 8 is a part-sectional side elevation taken along line VIII—VIII of FIG. 7.

Referring to FIGS. 7 and 8, the lens system shown includes an optical portion 3 and a lens fixation or support member 1 in the form of an eccentric rim (haptic rim) contiguous with the optical portion 3 throughout its circumference. A pair of apertures 4 are formed in the hauptic rim and, preferably, as shown, in the region where the haptic rim joins with the optical portion 3. The haptic rim 1 includes a recess portion 8 at the horizontal center line of the lens system. The recess 8 is generally symmetrical about the horizontal center line of the lens system and extends to a position adjacent the juncture of the haptic rim 1 and optical portion 3.

A transiridially flexible lens fixation or support member in the form of a flexible wire 5′ is mounted on the optical portion 3 at aperture 9 and the end of the flexible wire 5′ is upset and fixed in the aperture 9. The flexible wire 5′ extends radially outwardly from the upper surface of the optical portion 3. The remote or free end, generally indicated at 10, extends beyond the circumference of the rim 1 and is curved downwardly, e.g., forming a hook.

A support member or lens fixation member in the form of a loop 12 extends from the lower surface of the optical portion 3. The ends of the loop 10 are embedded in the optical portion 3 at apertures 11 and spaced relatively close together on opposite sides of the horizontal center line of the optical portion 3, see FIG. 7. The loop 12 is shaped so that it initially extends downwardly from the optical portion 3 and then extends horizontally outwardly curving towards the circumference of the haptic rim 1 which it approximates at the horizontal center line of the haptic rim 1.

When the embodiment illustrated in FIGS. 7 and 8 is implanted in the eye, loop 12 is inserted through the pupillary aperture to a position behind the iris and the haptic rim 1 is positioned in front of the iris. A slit is made in the iris and the flexible wire 5′ which is positioned in front of the iris is moved through the slit so that its curved end 10 engages the loop 12.

Figure 9:
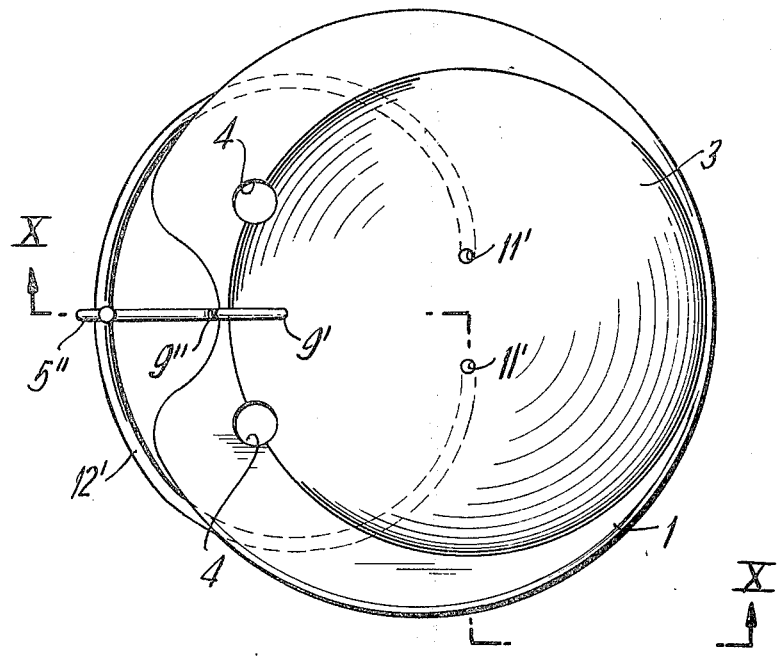
FIG. 9 is a plan view of another embodiment of a lens system according to the present invention.
Figure 11:
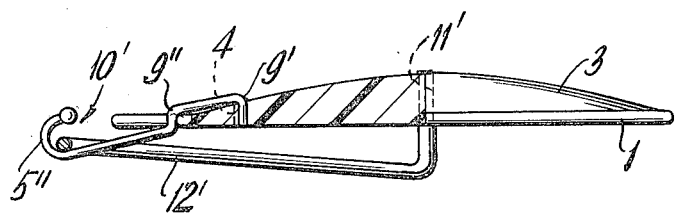
FIG. 11 is a view of the line system of FIG. 10 with the flexible lensfixation member enlarging the loop.

Referring to FIGS. 9 and 11, this embodiment is similar to that illustrated in FIGS. 7–8. However, the curvature of loop 12 extends outwardly beyond the circumference of the haptic rim 1, and the flexible wire 5'' after exiting from aperture 9' runs along the upper surface of the optical portion 3 and enters aperture 9'' (generally at the juncture of the optical portion 3 and haptic rim 3). The flexible wire 5'' emerges from the aperture 9'' at the lower surface of the lens system and extends radially outwardly therefrom. The remote or free end, generally indicated at 10', is curved upwardly forming, e.g., a hook. The free end may include a bead fused thereto to round it off.

Figure 10:
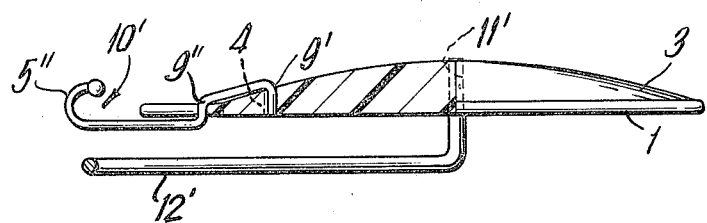
FIG. 10 is a part-sectional side elevation taken along line X—X of FIG. 9.

The embodiment illustrated in FIGS. 9–11 is implanted in the eye in a similar manner to the embodiment of FIGS. 7–8. However, with the embodiment of FIGS. 9–11, the curved free end 10' is hooked under the loop 12', see FIG. 11, whereas with the embodiment of FIGS. 7–8, the curved free end 10 is hooked over the loop 12. Advantageously, the former provides a simpler surgical operation.

I claim

1. An artificial intra-ocular lens system, comprising an optical portion and a lens support portion including first lens support means to be positioned posterior to the iris and second lens support means to be positioned anterior to the iris, said first and second lens support means cooperating to prevent displacement of the lens system through the pupillary aperture, said second lens support means including a haptic rim connected to and contiguous with at least a major portion of the circumference of the optical portion of the lens system, and in that the lens system comprises transiridial lens-fixation means for transiridially fixing the lens system in the eye.

2. A lens system as claimed in claim 1, wherein said transiridial lens-fixation means comprises at least two apertures formed in the lens system, said apertures allowing the passage of a suture to be inserted by means of a needle.

3. A lens system as claimed in claim 1, wherein said transiridial lens-fixation means comprises at least two apertures formed in said haptic rim, said apertures allowing the passage of a suture inserted by means of a needle.

4. An artificial intra-ocular lens system, comprising an optical portion, a first lens fixation means adapted to be positioned posterior to the iris, said first lens fixation means having its ends affixed to said optical portion and shaped to form an outwardly extending loop, a second lens fixation means including a haptic rim contiguous with at least a portion of the circumference of said optical portion and eccentric thereto, transiridial lensfixation means for transiridially fixing the lens system in the eye, said transiridial lens-fixation means including at least two apertures formed in the lens system, said apertures allowing the passage of a suture to be inserted by a needle, said transiridial lens-fixation means further including a flexible wire to be positioned anterior to the iris and adapted to engage said loop for transiridially fixing the lens system in the eye.

5. An artificial intra-ocular lens system, comprising an optical portion and a lens support portion including first lens support means to be positioned posterior to the iris and second lens support means to be positioned anterior to the iris, said first and second lens support means cooperating to prevent displacement of the lens system through the pupillary aperture, said second lens support means including: a haptic rim connected to and contiguous with at least part of the circumference of the optical portion of the lens system, and in that the lens system comprises transiridial lens-fixation means for transiridially fixing the lens system in the eye, said transiridial lens-fixation means comprising a transiridially flexible lens-fixation member.

6. An artificial lens system, comprising an optical portion and a lens support portion including first lens support means to be positioned posterior to the iris and second lens support means to be positioned anterior to the iris, said first and second lens support means cooperating to prevent displacement of the lens system through the pupillary aperture, said second lens support means including a haptic rim connected to and contiguous with at least part of the circumference of the optical portion of the lens system, and in that the lens system comprises transiridial lens-fixation means for transiridially fixing the lens system in the eye, said transiridial lens-fixation means comprising a transiridially flexible metal wire.

7. A lens system as claimed in claim 6, wherein said transiridially flexible metal wire is curved downwardly at its free end.

8. A lens system as claimed in claim 6, wherein said transiridially flexible metal wire is curved upwardly at its free end.

9. An artificial intra-ocular lens system, comprising and optical portion and a lens support portion including first lens support means to be positioned posterior to the iris and second lens support means to be positioned anterior to the iris, said first and second lens support means cooperating to prevent displacement of the lens system through the pupillary aperture, said second lens support means including a haptic rim connected to and contiguous with at least part of the circumference of the optical portion of the lens system, and in that the lens system comprises transiridial lens-fixation means for transiridially fixing the lens system in the eye, said transiridial lens-fixation means comprising at least two apertures formed in said haptic rim and a transiridially flexible lensfixation member permanently connected to said haptic rim.

10. An artificial intra-ocular lens system, comprising an optical portion and a lens support portion including first lens support means to be positioned posterior to the iris and second lens support means to be positioned anterior to the iris, said first and second lens support means cooperating to prevent displacement of the lens system through the pupillary aperture, said second lens support means including a haptic rim connected to and eccentrically contiguous with the entire circumference of the optical portion of the lens system, and in that the lens system comprises transiridial lens-fixation means for transiridially fixing the lens system in the eye.

11. An artificial intra-ocular lens system, comprising an optical portion and a lens support portion including first lens support means to be positioned posterior to the iris and second lens support means to be positioned anterior to the iris, said first and second lens support means cooperating to prevent displacement of the lens system through the pupillary aperture, said second lens support means including a haptic rim having a recess, said haptic rim being connected to and contiguous with at least part of the circumference of the optical portion of the lens system, and in that the lens system comprises transiridial lens-fixation means for transiridially fixing the lens system in the eye.

12. An artificial intra-ocular lens system, comprising an optical portion and a lens support portion including first lens support means to be positioned posterior to the iris and second lens support means to be positioned anterior to the iris, said first and second lens support means cooperating to prevent displacement of the lens system through the pupillary aperture, said first lens support means including a wire loop having its ends embedded in said optical portion in closely spaced relationship, said wire loop being shaped to initially extend away from the bottom surface of said optical portion and then extend radially outward toward the circumference of said haptic rim to form said wire loop, said second lens support means including a haptic rim connected to and contiguous with at least part of the circumference of the optical portion of the lens system, and in that the lens system comprises transiridial lens-fixation means for transiridially fixing the lens system in the eye.

13. A lens system as claimed claim 12, wherein said wire loop extends beyond the circumference of said haptic rim.

14. A lens system as claimed in claim 12, wherein said wire loop substantially follows the circumference of said haptic rim along a portion thereof.

* * * * *